(12) United States Patent
Powell et al.

(10) Patent No.: US 6,746,094 B1
(45) Date of Patent: Jun. 8, 2004

(54) IMAGING SYSTEM AND METHOD OF DETERMINING INSUFFICIENT COLORANT

(75) Inventors: Julie A. Powell, Encinitas, CA (US); Alan E. Cariffe, San Diego, CA (US); Matthew G. Lopez, Escondido, CA (US); Gareth R. Kelly, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/285,064

(22) Filed: Oct. 30, 2002

(51) Int. Cl.[7] .......................... B41J 29/393; B41J 29/38
(52) U.S. Cl. ........................................... 347/19; 347/14
(58) Field of Search ............................. 347/19, 12, 14, 347/23, 10, 5, 24, 43, 41, 7, 8; 399/27, 28, 29, 23; 358/1.9

(56) References Cited

U.S. PATENT DOCUMENTS

| | | |
|---|---|---|
| 5,655,174 A | 8/1997 | Hirst |
| 5,794,094 A | 8/1998 | Boockholdt et al. |
| 5,815,768 A | 9/1998 | Clifton |
| 5,877,787 A * | 3/1999 | Edge ............................. 347/19 |
| 5,960,230 A | 9/1999 | Peter |
| 6,257,693 B1 * | 7/2001 | Miller et al. .................... 347/19 |
| 6,275,664 B1 | 8/2001 | Wolf et al. |
| 6,312,075 B1 | 11/2001 | Walker |
| 6,343,194 B1 | 1/2002 | Shimada |
| 6,349,183 B1 | 2/2002 | Nagamine et al. |

* cited by examiner

Primary Examiner—Stephen D. Meler
Assistant Examiner—Charles Stewart, Jr.

(57) ABSTRACT

An imaging system, including a print engine and a processor assembly, wherein the processor assembly is configured to determine the colorant needed to produce a hard copy of a print or copy job, and compare the determined amount of colorant to the amount of colorant available to the print engine.

36 Claims, 3 Drawing Sheets

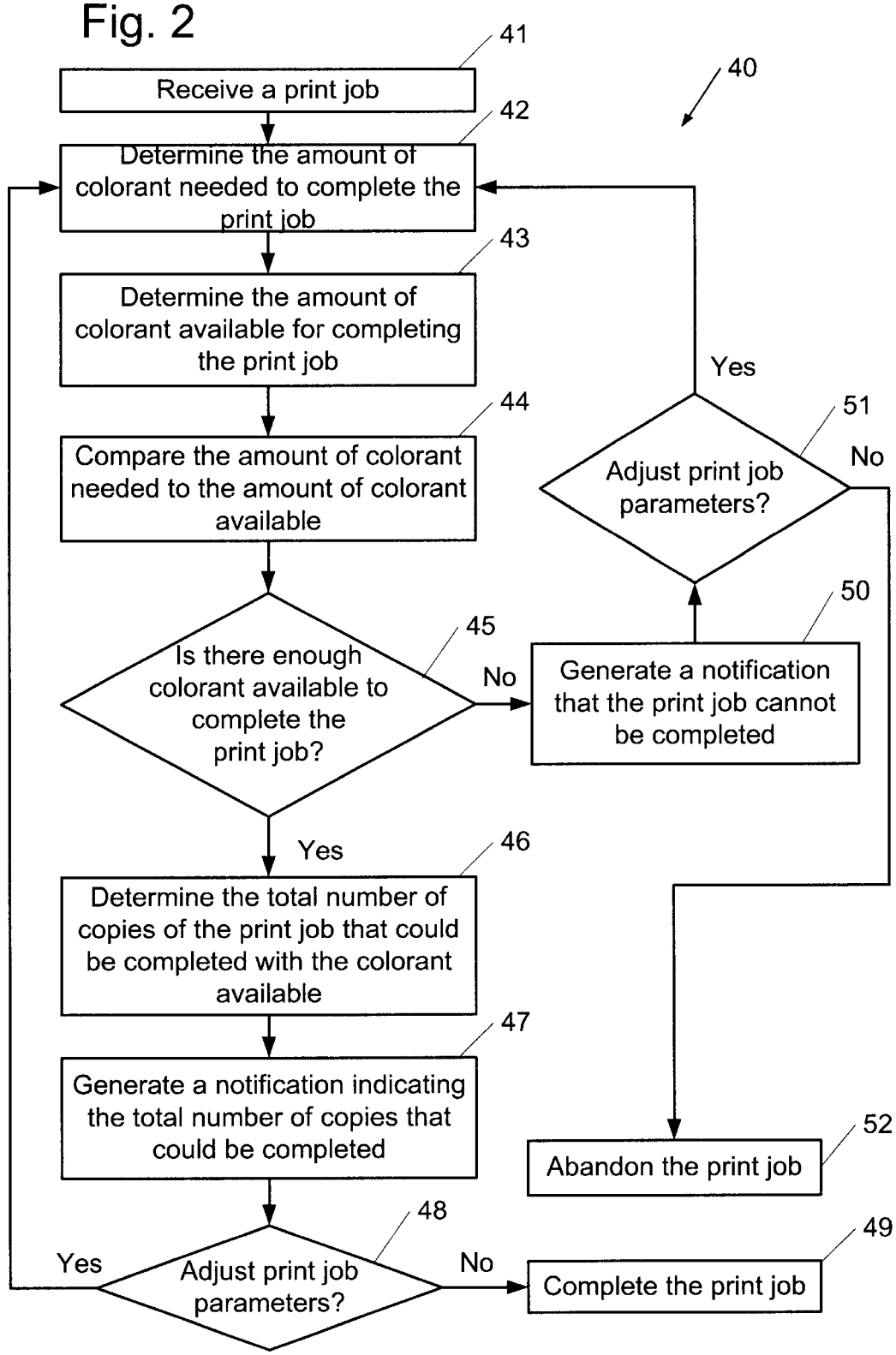

IMAGING SYSTEM AND METHOD OF DETERMINING INSUFFICIENT COLORANT

BACKGROUND OF THE INVENTION

An imaging apparatus such as a printer or a copier typically applies a colored material such as a dry powder toner or liquid ink to media to form a desired image. Most imaging apparatus therefore keep a supply of such colored material, or colorant, stored in a reservoir where it is available for use in producing an image.

It is important that the imaging apparatus provide an adequate supply of colorant so that a given print job may be completed. Running out of either toner or ink during printing or copying typically results in unacceptable print quality and a concomitant waste of resources, such as print media, while the printing continues. Some imaging apparatus actively halt printing when the colorant supply is exhausted or low, in order to prevent such unacceptable print quality, or more importantly, to avoid damage to the printing apparatus itself. As a result, a print job may be halted at an intermediate point, also causing frustration and potentially wasting resources.

Although some printers, copiers, and other imaging devices may include the ability to measure, track, or report consumable supplies such as ink or toner, this ability is typically limited to a "toner low" or "ink low" alert. However, in the case of an extensive print job, the alert may not be triggered before the lengthy print process is initiated, with the result that the ink supply is exhausted before the print job is completed. Such incidents may again cause significant frustration and waste of resources.

Similarly frustrating is the inability to accurately predict how many copies of a desired document might be printed with the ink supply that is available for use. Such a prediction could enable a user to immediately select the maximum number of copies of a desired document that could be printed with the ink supply available.

SUMMARY OF THE INVENTION

An imaging system, including a print engine and a processor assembly, is provided wherein the print engine is coupled to an available amount of at least one colorant, and is configured to apply the colorant to media. The processor assembly is coupled with the print engine, and is configured to receive a print job, and convert it into a corresponding set of print engine commands for applying the colorant to the media to produce an image. The processor assembly is also configured to determine an amount of colorant needed to produce the image and compare the determined amount of colorant to the amount of colorant available.

BRIEF DESCRIPTION OF THE DRAWINGS

FIG. 2 is a flowchart depicting a method of determining whether sufficient colorant is available to complete a print job, according to an embodiment of the invention.

DETAILED DESCRIPTION

Figure 1:
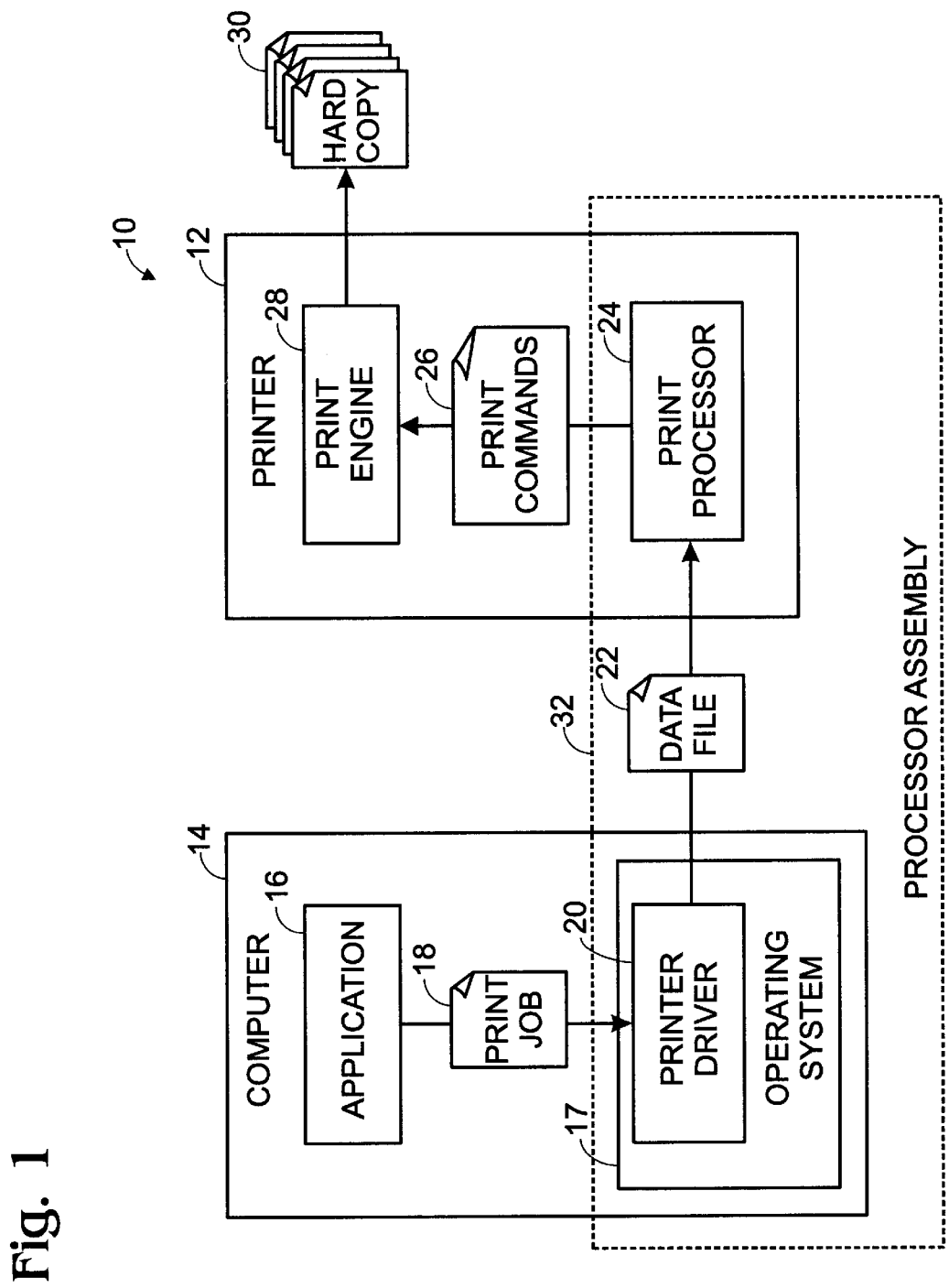
FIG. 1 is a schematic diagram of an imaging system having a printer and an associated computer.

Referring to FIG. 1, an imaging system 10 including at least one imaging apparatus 12 is shown. For the purposes of this disclosure, the imaging apparatus is in the form of an inkjet printer that employs one or more inkjet printheads and an associated ink supply. However, the present invention is applicable to any of a variety of other imaging apparatus, including for example, laser printers, facsimile machines, copiers, or any other imaging apparatus capable of applying one or more colorants to a medium or media. The imaging apparatus may include an electrophotographic print engine, or an inkjet print engine. The colorant may be ink, toner, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Imaging system 10 further includes an associated computer 14, that may be coupled to printer 12, such as by a direct communications link or a network connection. Computer 14 typically executes an application program 16 that may be used to create, edit, view, or print an electronic document. When a user selects a document associated with application program 16 to be printed, that document typically becomes a print job 18.

A print job, as used herein, typically includes the document to be printed, but may optionally include a variety of additional information relating to, for example, the number of copies of the document to be printed, the type of media to use for printing, the print quality to be used, or whether the print job should be created by simplex or duplex printing, among other information. The print job may include only a portion of a larger document, for example a selected subset of document pages. The print job may correspond to an initial discrete portion of a larger document that is in the process of being transmitted to the imaging system. Where the imaging apparatus is a copier, for example, the print job may include a scanned image of an original document, as well as information relating to the number of copies of the original document to be printed.

The imaging system typically includes a processor assembly 32, configured to receive a print job 18, and to convert it into a corresponding set of print engine commands 26 for applying the colorant to the media to produce a hard copy 30 that corresponds to the content of print job 18. As used herein, processor assembly 32 may include the printer driver 20 and an operating system 17 of a computer 14 associated with an imaging apparatus. Processor assembly 32 may also include a print processor 24, typically resident in the imaging apparatus.

The conversion of print job 18 into the set of print engine commands 26 is typically initiated when printer driver 20 receives print job 14 in an operating-system and printer-driver-specific format, and converts it into a data file 22 that may be in a format appropriate to be sent to printer 12. Such formats include, for example, bit-mapping, or object-mapping (or vector graphics). A bit-mapped document, also known as a rasterized document, typically corresponds to a collection of small dots (pixels) arranged in a pattern. Rasterized documents may produce subtler shading than vector objects upon imaging, but they typically require correspondingly larger data files. Object-mapped documents describe an image or a page in terms of geometrical objects such as lines, arcs, and circles. Data file 22 may exist in a page description language, or PDL. Selected particular page description languages include various versions of POSTSCRIPT (Adobe Systems Incorporated) and various versions of PCL (Printer Control Language, Hewlett-Packard Company). Another data file format used by the WINDOWS operating system (Microsoft Corporation) to represent graphical objects and transmit them to output devices, is the Graphical Device Interface format (or GDI).

As indicated, data file 22 is then typically received by printer 12, and converted by a print processor 24 into a set of print engine commands 26. For example, print processor 24 may convert the data file (in a page description language) into a corresponding collection of rasterized image strips, that may then be sent to print engine 28 for generation of a corresponding image (i.e., text, graphics etc.). The set of print engine commands 26 typically includes specific instructions to the print engine to apply the necessary amount of the desired colorant(s) to the selected media at the appropriate locations so as to produce the desired hard copy 30 corresponding to the original print job 18. The conversion process that determines the particular colorant to be applied to a particular location may also be referred to as a pixelation algorithm, as the conversion may include pixelation, dithering, and/or other calculations used to generate an accurate representation of the image data given the capabilities of the print engine being used.

Imaging system 10 includes a means of determining the amount of colorant available for further printing. That is, the amount of remaining toner, ink, or other colorant available to the print engine for applying to media. Where the imaging apparatus is an electrophotographic printer or copier, the toner available may be determined by any of a variety of toner level sensing devices and systems known in the art, for example as set forth in previous patents filed by the Hewlett-Packard Company (for example U.S. Pat. Nos. 5,794,094 to Boockholdt et al. (1998), 5,815,768 to Clifton (1998), and 5,655,174 to Hirst (1997), all hereby incorporated by reference). Where the imaging apparatus is an ink-based printer, the ink supply may include any of a variety of ink level sensing devices and systems. More typically, the imaging apparatus is an inkjet printing printer, and the amount of colorant available for further printing is determined utilizing a drop counter.

A given drop counter may be implemented in hardware, firmware or software, and is typically included as a function of an ASIC (Application Specific Integrated Circuit) that is incorporated in print processor 24. A drop counter typically stores within volatile or non-volatile memory the cumulative number of ink drops fired since the relevant ink supply has been replenished. A drop count may be maintained for each inkjet pen in the printer. The drop counter typically records instances of print nozzle firing commands that are generated by the print processor, that is, the set of print commands 26 that include inkjet firing signals may be recorded by the drop counter. The specific volume of a fired drop of ink is typically well-characterized, so that, by determining the cumulative number of drops ejected since the ink supply was replenished, the amount of ink still available in the ink supply may be calculated, particularly where standardized ink containers having known ink capacity are used to replenish the ink supply.

The present imaging system is typically configured to relate the amount of colorant available to the imaging system to the amount of colorant required to complete a particular print job, as generally shown in flowchart 40 of FIG. 2. A method of the invention may include receiving a print job, as indicated at 41, determining the amount of colorant needed to complete the print job, as indicated at 42, and determining the amount of colorant available for completing the print job, as indicated at 43. The amount of colorant needed to complete the print job may then be compared to the amount of colorant available, as shown at 44.

The processor assembly may be configured to utilize the comparison between the amount of colorant needed and the amount of colorant available in a number of ways. For example, the processor assembly may then determine whether there is sufficient colorant available to complete the print job, as shown at 45. If sufficient colorant is available, the processor assembly may determine the total number of copies of the print job that could be completed using the colorant available, as shown at 46. This determined total number of copies could be communicated to a user via a notification generated by the processor assembly, as shown at 47. The user may then have the opportunity to adjust one or more print job parameters, such as the number of copies desired, the print quality used to complete the print job, the type of colorant selected for completing the print job, among other print job parameters. Upon adjustment of at least one print job parameter, the processor assembly may again determine the amount of colorant needed to complete the print job using the new print job parameters, as shown at 42, and so forth. Alternatively, the user may not elect to adjust any of the print job parameters, whereupon the print job may be completed, as shown at 49.

Where the processor determines that there isn't enough colorant available to complete the print job, as shown at 45, the processor assembly may generate a notification to the user that the print job cannot be completed, as shown at 50, and may then provide the user an opportunity to adjust the print job parameters, as discussed above, and as shown at 51. If new parameters are selected, the processor assembly may determine the amount of colorant needed to complete the print job using the new print job parameters, again as shown at 42, and so forth. Alternatively, if the user elects not to adjust any of the print job parameters so as to yield a print job that may be completed with the available colorant, the print job may then be abandoned, as shown at 52.

In one exemplary print process, a user could send a print job to an imaging system. Before the printing is begun, the user may receive a notification that includes the determined maximum number of copies of that particular print job that could be completed with the colorant that is available to the imaging system. The user may be prompted to select either an increased or decreased number of copies to be completed by the imaging system, and the revised print job is then completed.

Figure 5:
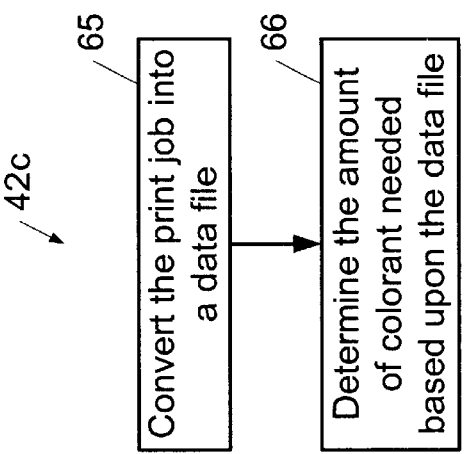
FIG. 5 is a flowchart depicting determining an amount of colorant needed to complete a print job according to yet another embodiment of the invention.
Figure 4:
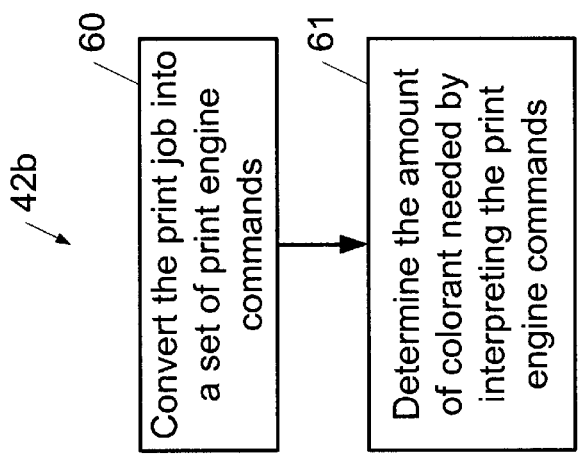
FIG. 4 is a flowchart depicting determining an amount of colorant needed to complete a print job according to another embodiment of the invention.
Figure 3:
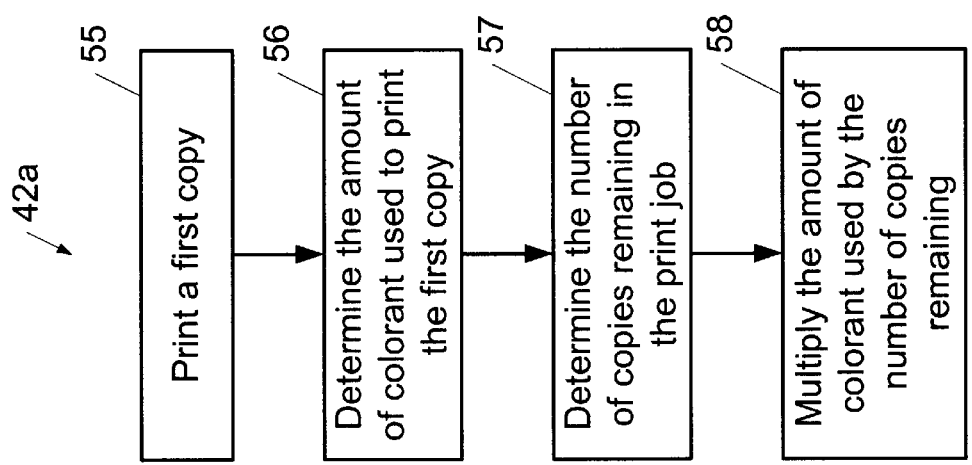
FIG. 3 is a flowchart depicting determining an amount of colorant needed to complete a print job according to an embodiment of the invention.

The amount of colorant needed to complete a particular print job may be determined in a variety of ways, as shown in the flowcharts of FIGS. 3–5. Determining the amount of colorant needed may be accomplished by processor assembly 32, where processor assembly 32 optionally includes computer 14, print processor 24, or both. Processor assembly 32 may consider the effect of a selected print mode on colorant use. That is, a print job that is designated for 'high quality' output may utilize more colorant than a print job that is designated for 'draft' output. Typically, higher quality print modes require greater amounts of applied colorant, so as to improve the appearance of the resulting produced image.

As discussed above, print job 18 may include all or a portion of a document to be printed, as well as information relating to the number of copies of the document or document portion to be printed. As shown in flowchart 42a of FIG. 3, processor assembly 32 may determine an amount of colorant needed to produce hard copy 30 by printing a first copy of the document to be printed, as indicated at 55, and determining the amount of colorant used in printing that first copy, as indicated at 56. As discussed above, where printer 12 is an inkjet printer, printer 12 may include a drop counter, and processor assembly 32 may determine the number of drops of each ink that are applied to the media to produce the first copy, for example, by subtracting the cumulative number of drops of ink counted just prior to printing the first copy from the cumulative number of drops of ink counted just after printing the first copy. The difference thus typically corresponds to the number of drops of ink ejected in order to produce the first copy. A similar calculation may be performed for each individual ink supply (inkjet pen) available to the print engine.

Once the amount of colorant required to produce the first copy has been determined, the total amount of colorant needed to complete the entire print job (i.e., print the remaining number of copies in the print job) may be determined. The processor assembly thus may first determine the number of copies remaining to be printed in order to complete the print job, as shown at 57, and then may multiply the amount of colorant used to produce the first copy by the number of copies remaining in the print job, as shown at 58.

Alternatively, as shown in flowchart 42b of FIG. 4, processor assembly 32 may determine an amount of colorant needed to complete the print job by first converting the print job into a set of print engine commands, as shown at 60, and determining the amount of colorant needed by interpreting the set of print engine commands, as shown at 61. In the case where printer 12 is an inkjet printer, the print engine commands 26 correspond to the instructions sent to the print engine to apply drops of ink to particular locations on the media so as to produce the desired image. The processor assembly may analyze the print engine commands before the commands are physically executed, for example by suppressing, disabling, or delaying the response of the print engine during the analysis of the print engine commands. The interpretation of the set of print engine commands may include analyzing the output of a pixelation algorithm or other rasterization process. The number and types of ink drops to be applied by the print engine may be extracted from the set of commands 26, and may correspond closely, if not exactly, to the number and types of ink droplets that would subsequently be applied to the media upon the actual execution of print commands 26 with the concomitant generation of a hard copy corresponding to the print job.

In yet another alternative method, as shown in flowchart 42c of FIG. 5, processor assembly 32 may determine the amount of colorant needed to complete the print job by first converting the print job into a data file, as shown at 65, and then determining the amount of colorant needed based upon the data file, as shown at 66. As data file 22 includes a description of the image, the image information contained in the data file may be correlated with an expected colorant consumption. A variety of methods may be used to correlate image data with colorant consumption. For example, a specific program may be used to calculate the amount of colorant that will be consumed in printing each page of a submitted print job. Such a program may be referred to as a densiometer program. Alternatively, the data file may be analyzed directly, such as where the data file includes bitmap data, or is in a page description language that facilitates such an analysis (for example PCL3), or colorant consumption may be estimated by interrogating a calibration table, or look-up table.

Such calibration table may correlate color data over a selected image area, as encoded in the image information, with the amount of colorant that would be required to produce the corresponding image at the associated printer or copier. Such color data may include color type and/or color density. The calibration table may be prepared by the printer manufacturer. Alternatively, a user may print a standardized test page, and the processor assembly may determine the amount of ink used to generate the test page (according to methods described above) and use the relationship between the image data of the test page and the colorant used to print the test page in order to relate the image information contained in the print job to the amount of colorant needed to complete the print job.

Generally, once processor assembly 32 has determined both the amount of colorant needed to complete the print job, and the amount of colorant available to the printer for completing the print job, the processor assembly may evaluate whether or not the print job can be completed using the available colorant. That is, where the amount of colorant available to the printer is greater than the amount of colorant needed, the print job can be completed. Where the amount of colorant available to the printer is less than the amount of colorant needed, the print job cannot be completed. Where there is sufficient colorant to complete the print job, the processor assembly may evaluate how many additional copies of the print job can be completed using the available colorant.

Where it is determined that the printer has a sufficient colorant supply available to complete the print job, the print job is typically completed, as shown at 45 of FIG. 2. Alternatively, where the determined amount of colorant available is insufficient to complete the print job, the imaging system typically generates a notification for the operator or user, as shown at 46 of FIG. 2.

The notification, or alert, may be displayed by the printer, such as on an integral display (not shown), for example, an LCD screen display. Alternatively, the notification may be displayed by the associated computer 14, using a display or other output device. In any case, the notification will typically include a warning that the print job cannot be completed. In addition, the notification may include an indication of how many copies remaining in a print job could be completed using the colorant available to the printer.

Where there is sufficient colorant to complete the print job, the notification may include an indication of how many complete copies of the print job could be generated using the remaining colorant. Alternatively, or in addition, the processor assembly may generate a running notification of how many copies of a print job could be completed based on only the fraction of the print job received at a given point.

Where there is insufficient colorant to complete the print job, the notification that the print job cannot be completed may also include a notification how much of the particular print job could be completed using the amount of colorant that is available. For example, for a print job that includes thirty copies of a document, the processor assembly may determine that there is only sufficient colorant available to produce twenty-two full copies of the document. The notification might therefore include an indication that the entire print job can not be completed, but that twenty-two copies or less could be completed. The imaging system may then optionally prompt the operator to select whether less than the full number of copies should be printed, or whether the print job should be abandoned.

Alternatively, or in addition, where the printer is capable of applying multiple distinct colorants to the media, the notification may include an identification of the particular colorant that is limiting the completion of the print job. Typically, the supply of one of the colorants is limiting in determining whether a particular print job may be completed. The notification may therefore include an indication of the ink that is in short supply. The colorant supply that is limiting the completion of a print job may not necessarily be the colorant supply that is lowest. For example, a printer that is capable of dispensing cyan, magenta, yellow, and black (key) inks may have less yellow ink available than any other ink, but the black ink may be the limiting factor in whether a particular print job may be completed, if the print job in question requires relatively more black ink than yellow ink to produce a desired hard copy.

The present invention also includes software instructions for executing one or more aspects of a method of the present invention. The appropriate software instructions are typically associated with a computer-readable medium. A "computer-readable medium," as used herein, can be any means that can contain, store, communicate, propagate, or transport such instructions for use by or in connection with an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The instruction on the computer-readable media may represent an upgrade to imaging system software previously available, in order to permit the execution of a method of the present invention, or to execute an upgraded version of such software.

Although the present invention has been shown and described with reference to the foregoing operational principles and embodiments, it will be apparent to those skilled in the art that various changes in form and detail may be made without departing from the spirit and scope of the invention. The present invention is intended to embrace all such alternatives, modifications and variances which fall within the scope of the appended claims.

What is claimed is:

1. An imaging system, comprising:
   a print engine coupled to an available amount of a colorant, where the print engine is configured to apply the colorant to media;
   a processor assembly coupled with the print engine, where the processor assembly is configured to receive a print job, and to convert the print job into a corresponding set of print engine commands to apply the colorant to the media to produce a hard copy that corresponds to the print job;
   wherein the processor assembly is configured to determine an amount of colorant needed to produce the hard copy and compare the determined amount of colorant to the amount of colorant available.

2. The imaging system of claim 1, wherein the processor assembly is further configured to determine a number of hard copies of the print job that could be produced using the colorant available.

3. The imaging system of claim 2, wherein the processor assembly is further configured to generate an indication of the number of additional hard copies of the print job that could be produced using the colorant available.

4. The imaging system of claim 1, wherein the processor assembly is further configured to generate an indication when the amount of colorant available is less than the determined amount of colorant needed.

5. The imaging system of claim 1, wherein the print job includes multiple copies of a document.

6. The imaging system of claim 5, wherein the processor assembly is configured to determine the amount of colorant needed by producing a first copy of the document, determining an amount of colorant used to produce the first copy, determining a number of copies remaining in the print job, and multiplying the amount of colorant used by the number of copies remaining in the print job.

7. The imaging system of claim 6, wherein the imaging system includes an inkjet printer, and the processor assembly uses a drop counter to determine the amount of colorant used to produce the first copy.

8. The imaging system of claim 1, wherein the imaging system is a copier, and the print job includes multiple copies of a scanned document.

9. The imaging system of claim 1, wherein the processor assembly is configured to convert the received print job to a data file, and to determine the amount of colorant needed based on the data file.

10. The imaging system of claim 9, wherein the data file includes a document in page description language.

11. The imaging system of claim 9, wherein the data file includes a rasterized document.

12. The imaging system of claim 1, wherein the processor assembly is configured to determine the amount of colorant needed by interpreting the set of print engine commands.

13. The imaging system of claim 1, wherein the imaging system includes one or more of a copier, an inkjet printer, or an associated computer.

14. The imaging system of claim 1, where the processor assembly includes a computer processor.

15. The imaging system of claim 1, wherein each colorant is a fluid ink.

16. The imaging system of claim 15, wherein the imaging system includes an inkjet printhead.

17. The imaging system of claim 15, wherein the amount of colorant available is determined using a drop counter.

18. A method of determining whether a print job can be completed by an imaging system, where the imaging system is configured to apply colorant to media, the method comprising:
   receiving a print job at a processor assembly;
   determining an amount of colorant needed to complete the received print job;
   determining an amount of colorant that is available to the imaging system; and
   comparing the determined amount of colorant to an amount of colorant that is available to the imaging system.

19. The method of claim 18, further comprising indicating whether the determined amount of colorant is greater than the amount of colorant available to the imaging system.

20. The method of claim 18, wherein the print job includes multiple copies of a document, and determining the amount of colorant needed to complete the present print job includes producing a first copy of the document, determining an amount of colorant used to produce the first copy, determining a number of copies remaining in the print job, and multiplying the amount of colorant used by the number of copies remaining in the print job.

21. The method of claim 20, wherein determining the amount of colorant needed includes considering an effect of a selected print mode on colorant use.

22. The method of claim 18, wherein receiving the print job includes converting the received print job to a data file, and determining the amount of colorant needed includes correlating the data file with colorant consumption.

23. The method of claim 22, wherein correlating the data file with colorant consumption includes interrogating a calibration table.

24. The method of claim 18, wherein the imaging system includes a print engine, and determining the amount of colorant needed includes converting the data file into a set of commands for the print engine, and relating the set of commands to the amount of colorant needed.

25. The method of claim 24, wherein converting the data file into a set of commands for the print engine includes applying a pixelation algorithm to the data file.

26. The method of claim 18, wherein indicating that the amount of colorant needed is greater than the amount of colorant available includes indicating that an amount of a particular colorant needed is greater than the amount of that colorant available.

27. The method of claim 18, wherein each colorant is an ink, and determining the amount of colorant needed to complete the present print job includes counting drops of ink.

28. The method of claim 18, wherein indicating that the amount of colorant needed is greater than the amount of colorant available includes notifying a user how much of the print job can be produced using the amount of colorant available.

29. A storage medium readable by a processor assembly, having embodied therein a program of commands executable by the processor assembly to:

determine an amount of a colorant needed for an imaging system to complete a particular print job;

determine an amount of the colorant available to the imaging system; and compare the amount of colorant needed to the amount of colorant available.

30. The storage medium of claim 29, wherein the program of commands includes commands executable by the processor assembly to indicate whether, the amount of colorant needed is greater than the amount of colorant available.

31. The storage medium of claim 29, wherein the program of commands includes commands executable by the processor assembly to determine a number of copies of the print job that could be completed using the colorant available.

32. The storage medium of claim 29, wherein the print job includes multiple copies, and the program of commands includes commands executable by the processor assembly to produce a first copy, measure an amount of colorant used to produce the first copy, and multiply the amount of colorant used by a number of copies remaining in the print job.

33. The storage medium of claim 29, wherein the program of commands includes commands executable by the processor assembly to receive the print job, convert the print job into a corresponding set of print engine commands, and determine the amount of colorant needed by interpreting the set of print engine commands.

34. The storage medium of claim 29, wherein the program of commands includes commands executable by the processor assembly to convert the particular print job to a data file, and determine the amount of colorant needed based on the data file.

35. An imaging system, comprising:

means for receiving a print job;

means for applying a colorant to a media to produce a hard copy corresponding to the print job;

means for determining an amount of colorant needed to produce the hard copy; and means for comparing the determined amount of colorant to an amount of colorant available for producing the hard copy;

wherein the print job includes multiple copies, and the amount of colorant needed is determining by producing a first copy, measuring an amount of colorant used to produce the first copy, and multiplying the amount of colorant used by a number of copies remaining in the print job.

36. An imaging system, comprising:

means for receiving a print job;

means to convert means for converting the print job into a corresponding set of commands to apply colorant to a media to produce a hard copy;

means for applying the colorant to the media to produce the hard copy corresponding to the print job;

means for determining an amount of colorant needed to produce the hard copy, the amount of colorant needed being determined by interpreting the set of commands; and means for comparing the determined amount of colorant to an amount of colorant available for producing the hard copy.

* * * * *

UNITED STATES PATENT AND TRADEMARK OFFICE
CERTIFICATE OF CORRECTION

PATENT NO. : 6,746,094 B1
DATED : June 8, 2004
INVENTOR(S) : Matthew G. Lopez et al.

It is certified that error appears in the above-identified patent and that said Letters Patent is hereby corrected as shown below:

Title page,
Item [75], Inventors, delete
"Julie A. Powell, Encinitas, CA, (US);
Alan E. Cariffe, San Diego, CA (US);
Matthew G. Lopez, Escondido, CA (US);
Gareth R. Kelly, San Diego, CA (US)" and insert therefor
-- Matthew G. Lopez, Escondido, CA (US);
Julie A. Powell, Encinitas, CA, (US);
Alan E. Cariffe, San Diego, CA (US);
Gareth R. Kelly, San Diego, CA (US) --

Signed and Sealed this

Eleventh Day of January, 2005

JON W. DUDAS
*Director of the United States Patent and Trademark Office*